(12) United States Patent
Alghunaimi et al.

(10) Patent No.: US 11,517,859 B2
(45) Date of Patent: Dec. 6, 2022

(54) COMPOSITE MATERIAL FOR REMOVAL OF HYDROPHOBIC COMPONENTS FROM FLUID MIXTURES

(71) Applicants: Saudi Arabian Oil Company, Dhahran (SA); King Fahd University of Petroleum and Materials, Dhahran (SA)

(72) Inventors: Fahd Ibrahim Alghunaimi, Khobar (SA); Nadeem Baig, Dhahran (SA); Hind Aldossary, Alkhobar (SA); Tawfik A. Saleh, Dhahran (SA)

(73) Assignees: Saudi Arabian Oil Company, Dhahran (SA); King Fahd University of Petroleum and Materials, Dhahran (SA)

( * ) Notice: Subject to any disclaimer, the term of this patent is extended or adjusted under 35 U.S.C. 154(b) by 203 days.

(21) Appl. No.: 16/897,946

(22) Filed: Jun. 10, 2020

(65) Prior Publication Data
US 2021/0387147 A1    Dec. 16, 2021

(51) Int. Cl.
*B01D 69/12* (2006.01)
*B01D 67/00* (2006.01)
(Continued)

(52) U.S. Cl.
CPC ......... *B01D 69/12* (2013.01); *B01D 67/0079* (2013.01); *B01D 71/021* (2013.01);
(Continued)

(58) Field of Classification Search
CPC .. B01D 69/12; B01D 67/0079; B01D 71/021; B01D 71/26; B01D 71/28; B01D 71/54;
(Continued)

(56) References Cited

U.S. PATENT DOCUMENTS

| 7,943,234 B2 | 5/2011 | Lawin et al. |
| 2014/0014586 A1 | 1/2014 | Soane et al. |

(Continued)

FOREIGN PATENT DOCUMENTS

| CN | 104771936 A | 7/2015 |
| CN | 105968254 A | 9/2016 |

(Continued)

OTHER PUBLICATIONS

International Search Report and Written Opinion dated Aug. 16, 2021 pertaining to International application No. PCT/US2021/027633 filed Apr. 16, 2021, 15 pages.
(Continued)

*Primary Examiner* — Krishnan S Menon
(74) *Attorney, Agent, or Firm* — Dinsmore & Shohl LLP

(57) ABSTRACT

Composite materials for removing hydrophobic components from a fluid include a porous matrix polymer, carbon nanotubes grafted to surfaces of the porous matrix polymer, and polystyrene chains grafted to the carbon nanotubes. Examples of porous matrix polymer include polyurethanes, polyethylenes, and polypropylenes. Membranes of the composite material may be enclosed within a fluid-permeable pouch to form a fluid treatment apparatus, such that by contacting the apparatus with a fluid mixture containing water and a hydrophobic component, the hydrophobic component absorbs selectively into the membrane. The apparatus may be removed from the fluid mixture and reused after the hydrophobic component is expelled from the membrane. The composite material may be prepared by grafting functionalized carbon nanotubes to a porous matrix polymer to form a polymer-nanotube composite, then polymerizing styrene onto the carbon nanotubes of the polymer-nanotube composite.

19 Claims, 11 Drawing Sheets

(51) Int. Cl.
| | |
|---|---|
| B01D 71/02 | (2006.01) |
| B01D 71/26 | (2006.01) |
| B01D 71/28 | (2006.01) |
| B01D 71/54 | (2006.01) |
| B01D 71/82 | (2006.01) |
| C02F 1/44 | (2006.01) |
| B82Y 30/00 | (2011.01) |
| C02F 101/32 | (2006.01) |
| C02F 103/08 | (2006.01) |

(52) U.S. Cl.
CPC .............. *B01D 71/26* (2013.01); *B01D 71/28* (2013.01); *B01D 71/54* (2013.01); *B01D 71/82* (2013.01); *C02F 1/44* (2013.01); *B01D 2323/345* (2013.01); *B01D 2323/385* (2013.01); *B01D 2325/021* (2013.01); *B01D 2325/20* (2013.01); *B82Y 30/00* (2013.01); *C02F 2101/32* (2013.01); *C02F 2103/08* (2013.01)

(58) Field of Classification Search
CPC .............. B01D 71/82; B01D 2323/345; B01D 2323/385; B01D 2325/021; B01D 2325/20; B01D 2323/04; B01D 2323/38; B01D 2325/12; B01D 2325/38; B01D 67/0093; C02F 1/44; C02F 2101/32; C02F 2103/08; C02F 1/681; C02F 1/283; C02F 1/285; C02F 2103/365; C02F 2305/08; C02F 1/288; B82Y 30/00; B01J 20/3212; B01J 20/3219; B01J 20/3278; B01J 20/3295; B01J 20/324; B01J 20/327; B01J 20/3289; B01J 20/3297; B01J 20/205; B01J 20/28033

See application file for complete search history.

(56) References Cited

U.S. PATENT DOCUMENTS

| | | |
|---|---|---|
| 2018/0290125 A1 | 10/2018 | Beall et al. |
| 2020/0156010 A1 | 5/2020 | Sajid et al. |
| 2020/0317831 A1 | 10/2020 | Awadh et al. |

FOREIGN PATENT DOCUMENTS

| | | |
|---|---|---|
| CN | 107876033 A | 4/2018 |
| WO | 2013107875 A1 | 7/2013 |

OTHER PUBLICATIONS

Gu, J. et al. "Janus Polymer/Carbon Nanotube Hybrid Membranes for Oil/Water Separation", Applied Materials & Interfaces, vol. 6, No. 18, Sep. 24, 2014, pp. 16204-16209.

Tanobe, V.O.A., et al. "Evaluation of flexible postconsumed polyurethane foams modified by polystyrene grafting as sorbent material for oil spills", Journal of Applied Polymer Science, vol. 111, No. 4 ,Feb. 15, 2009, pp. 1842-1849.

Beyou, E. et al. "Chapter 5: Polymer Nanocomposites Containing Functionalised Multiwalled Carbon NanoTubes: a Particular Attention to Polyolefin Based Materials", Syntheses and Applications of Carbon Nanotubes and Their Composites, Intech, May 9, 2013, pp. 77-115.

Bande et al., "Oil field effluent water treatment for safe disposal by electroflotation", Chemical Engineering Journal, vol. 137, pp. 503-509, 2008.

Bi et al., "Spongy Graphene as a Highly Efficient and Recyclable Sorbent for Oils and Organic Solvents", Adv. Funct. Mater, vol. 22, No. 21, pp. 4421-4425, 2012.

Cao et al., "Facile synthesis of fluorinated polydopamine/chitosan/reduced graphene oxide composite aerogel for efficient oil/water separation", Chemical Engineering Journal, vol. 326, pp. 17-28, 2017.

Cao et al., "Polyurethane sponge functionalized with superhydrophobic nanodiamond particles for efficient oil/water separation", Chemical Engineering Journal, vol. 307, pp. 319-325, 2017.

Chang et al., "Solar-Assisted Fast Cleanup of Heavy Oil Spill by a Photothermal Sponge", Journals of Materials Chemistry A, Manuscript, http://dx.doi.org/10/1039/c8ta00779a, Apr. 16, 2018.

Chen et al., "Additive-free poly (vinylidene fluoride) aerogel for oil/water separation and rapid oil adsorption", Chemical Engineering Journal, vol. 308, pp. 18-26, 2017.

Fujita et al., "An onboard Vacuum Suction spilled Oil Recovery System", Ocean. '04 MTS/IEEE Techno-Ocean '04 (IEEE Cat. No. 04CH37600), IEEE, 2006: pp. 1458-1463. doi:10.1109/OCEANS.2004.1406335.

Ge et al., "A superhydrophobic/superoleophilic sponge for the selective adsorption oil pollutants from water", Colloids and Surfaces A: Physicochem. Eng. Aspects, vol. 457, pp. 397-401, 2014.

Gui et al., "Recyclable carbon nanotube sponges for oil adsorption", Acta Materialia, vol. 59, pp. 4798-4804, 2011.

Hayase et al., "Facile Synthesis of Marmallow-like Macroporous Gels Usable under Harsh Conditions for the Separation of Oil and Water", Hydrophobic Gels, Angew. Chemie Int. Ed. 2013, 52 (7), 1986-1989.

Jin et al., "A review of the preparation and properties of carbon nanotubes-reinforced polymer compositess", Carbon Letters, vol. 12, No. 2, pp. 57-69, 2011.

Lee et al., "Vertically-aligned carbon nano-tube membrane filters with superhydrophobicity and superoleophilicity", Carbon, vol. 48, pp. 2192-2197, 2010.

Li et al., "Robust superhydrophobic candle soot and silica composite sponges for efficient oil/water separation in corrosive and hot water", J. Sol-Gel Sci. Technol., vol. 82, pp. 817-826, 2017.

Parangusan et al., "Designing Carbon Nanotube-Based Oil Adsorbing Membranes from Gamma Irradiated and Electrospun Polystyrene Nanocomposites", Materials, vol. 12, 709, pp. 1-2, 2019.

Rahmani et al., "Nanoporous Graphene and Graphene Oxide-Coated Polyurethane Sponge as a Highly Efficient, Superhydrophobic, and Reusable Oil Spill Absorbent", Accepted Manuscript, S2213-3437(17)30466-9 http://dx.doi.org/10.1016/j.jece.2017.09.028 JECE 1876, Sep. 9, 2017.

Schaum et al., "Screening Level Assessment of Risks Due to Dioxin Emissions from Burning Oil from the BP Deep Water Horizon Gulf of Mexico Spill", U.S. Environmental Protection Agency and National Oceanic and Atmospheric Administration, pp. 1-27, Oct. 12, 2010.

Sung, "Oil Adsorption Performance and Efficiency Study on Novel Silane Functionalized Graphene Polyurethane Sponge", Thesis, 2017.

Takeuchi et al., "Oil sorptoin by exfoliated graphite from dilute oil-water emulsion for practical applications in produced water treatments", Journal of Water Process Engineering, vol. 8, pp. 91-98, 2015.

Teas et al., "Investigation of the effectiveness of absorbent materials in oil spills clean up", Desalination, vol. 140, pp. 259-264, 2001.

Wang et al., "Oil/water mixtures and emulsions separation of stearic acid-functionalized sponge fabricated via a facile one-step coating method", Separation and Purification Technology, vol. 181, pp. 183-191, 2017.

Wang et al., "Facile synthesis of flexible mesoporous aerogel with superhydrophobicity for efficient removal of layered and emulsified oil from water", Journal of Colloid and Interface Science, vol. 530, pp. 372-382, 2018.

Yang et al., "Surface roughness induced superhydrophobicity of graphene foam for oil-water separation", Journal of Colloid and Interface Science, vol. 508, pp. 254-262, 2017.

Yu et al., "Facile Preparation of the Porous PDMS Oil-Adsorbent for Oil/Water Separation", Adv. Mater. Interfaces, pp. 1-5, 2017.

Zhang et al., "Enhanced oils and organic solvents adsorption by polyurethane foams composites modified with MnO2 nanowires", Chemical Engineering Journal, vol. 309, pp. 7-14, 2017.

(56) References Cited

OTHER PUBLICATIONS

Zhao et al., "Improvement of oil adsorption performance by a sponge-like natural vermiculite-carbon nanotube hybrid", Applied Clay Science, vol. 53, pp. 1-7, 2011.

Baig et al. "Initiator-Free Natural Light-Driven Vapor Phase Synthesis of a Porous Network of 3D Polystyrene Branched Carbon Nanofiber Grafted Polyurethane for Hexane /Water Separation" ChemistrySelect 2018, 3, 8312-8318.

COMPOSITE MATERIAL FOR REMOVAL OF HYDROPHOBIC COMPONENTS FROM FLUID MIXTURES

TECHNICAL FIELD

This application relates to polymer composite materials and, more particularly, to polymer composite materials for removing hydrophobic components from fluid mixtures.

BACKGROUND

Removal of hydrophobic materials such as oils and hydrocarbons from water is a necessary component of operations such as produced-water treatment, wastewater recycling, and large-scale oil-spill mitigation. In produced-water treatment, for example, the oil and hydrocarbon contents of the treated water must be reduced to minimal amounts of quantity to satisfy environmental regulations. Treatment of produced water not only improves the quality of the water for reuse but also can afford recovery of oil or hydrocarbons from the water. Common treatment methods such as chemical dispersants, skimming, and in situ burning are generally inefficient and potentially harmful to the environment. Therefore, ongoing needs exist for materials and methods that result in efficient and eco-friendly removal of hydrophobic components such as oil and hydrocarbons from fluid mixtures such as produced water, wastewater, and seawater.

SUMMARY

Against the previously described background, example embodiments of this disclosure are directed to a composite material for removing hydrophobic components from a fluid. The composite material includes a porous matrix polymer chosen from polyurethanes, polyethylenes, or polypropylenes. Carbon nanotubes are grafted to surfaces of the porous matrix polymer, and polystyrene chains are grafted to the carbon nanotubes. In some embodiments, the porous matrix polymer may be a foam material.

Further example embodiments are directed to a fluid treatment apparatus including a membrane of the composite material according to embodiments of this disclosure. The membrane is enclosed within a fluid-permeable pouch.

Further example embodiments are directed to methods for removing hydrophobic fluids from a fluid mixture containing water and a hydrophobic component. The methods include contacting a fluid treatment apparatus according to embodiments of this disclosure with the fluid mixture. The fluid mixture is then allowed to absorb through the fluid-permeable pouch to contact the membrane of the composite material. Upon contacting the membrane with the produced water, at least a portion of the hydrophobic component in the produced water adsorbs onto the membrane of the composite material. The fluid treatment apparatus is then removed from the fluid mixture.

Further example embodiments are directed to a filtration apparatus including a membrane of the composite material according to embodiments of this disclosure in fluidic communication with a produced water source.

Further example embodiments are directed to methods for preparing a composite material for removing hydrophobic components from a fluid. The methods may include exposing a membrane of a porous polymer material to a dispersion of hydroxyl-functionalized carbon nanotubes in a hydrophilic solvent. The porous matrix polymer may be chosen from polyurethanes, polyethylenes, or polypropylenes. In some embodiments, the porous matrix polymer may be a foam material. The hydroxyl-functionalized carbon nanotubes in the dispersion are allowed to graft to the porous matrix polymer and form a polymer-nanotube composite membrane. The polymer-nanotube composite membrane is then dried to remove the hydrophilic solvent. The polymer-nanotube composite membrane is then contacted with styrene to form a polymerization mixture. The polymerization mixture is exposed to ultraviolet radiation to polymerize the styrene and form the composite material. The final composite material thus includes the porous matrix polymer, carbon nanotubes grafted to the porous matrix polymer, and polystyrene chains grafted to the carbon nanotubes.

These and other features, aspects, and advantages of the present invention will become better understood with reference to the following description and the appended claims.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments of this disclosure, and together with the description serve to explain the principles and operations of the claimed subject matter.

DETAILED DESCRIPTION

Figure 1:
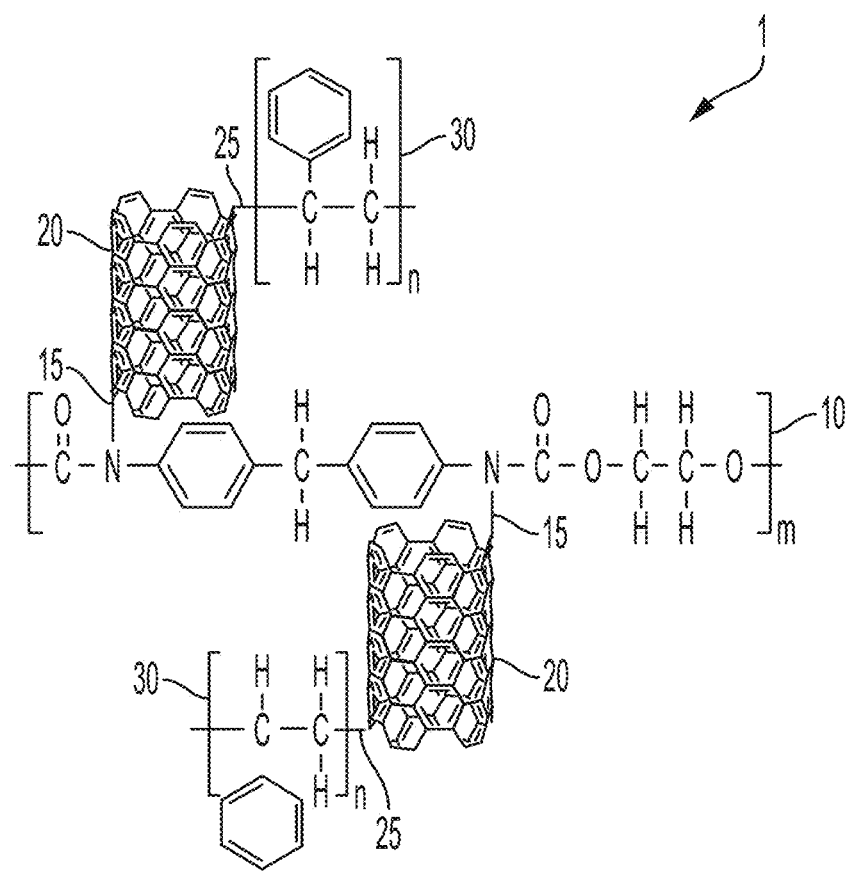
FIG. 1 is a schematic chemical diagram of an example composite material according to embodiments of this disclosure.

Reference will now be made in detail to embodiments of composite materials. The composite materials have both chemical structures and hydrophobicity characteristics suited for applying the composite materials in processes for removing hydrophobic components from a fluid. The composite materials include a porous matrix polymer, carbon nanotubes grafted to surfaces of the porous matrix polymer, and a hydrophobic polymer grafted to the carbon nanotubes.

The petroleum industry encounters various operations, during which needs arise to separate or recover hydrophobic fluids from an aqueous medium such as water. For example, during fracking operations, produced water is removed from drill bores, and the produced water contains oil and other organic compounds that must be removed to enable recycling, reuse, or proper disposal of the water. In other contexts, crude oil or other organic compounds may be unintentionally spilled into a body of water such as a river, lake, or ocean, necessitating a costly clean-up operation by either chemically breaking up the spilled compounds or physically removing them from the body of water.

Oil and organic compounds may be removed from water sources by absorption processes involving adsorption of the compounds onto or into a suitable material. Adsorption may involve a physical adhesion of the oil or organic compounds onto the surface of the adsorbent. For adsorption to occur to a practical extent, the adsorbent material ideally must be sufficiently hydrophobic to attract the oil or organic compound while repelling molecules of the water from which the oil or organic compound is to be removed. In particular, a greater hydrophobicity of an adsorbent material results in a greater adsorption capacity of oil or organic material per unit mass of adsorbent. Though polymer materials such as polyethylene, polypropylene, or polyurethane may have some amount of hydrophobicity, the amount is generally insufficient to permit them to be implemented for large-scale separations or removals in an efficient manner. Accordingly, the composite materials according to embodiments of this disclosure are chemically tailored to provide hydrophobicity and increase absorption capacity with respect to hydrophobic compounds or fluids such as petroleum and oils and organic compounds derived from petroleum or involved in petroleum recovery or processing.

The composite materials according to embodiments include a porous matrix polymer. The porous matrix polymer may include any polymer material to which carbon nanotubes may be chemically or physically grafted. Chemical grafting of carbon nanotubes to a polymer may include chemically treating the carbon nanotubes to provide functional groups such as hydroxyl or carboxyl groups, then reacting the functional group to the polymer backbone of the porous matrix polymer. Physical grafting of carbon nanotubes to a polymer may include exposing the carbon nanotubes to surfaces of the polymer, contacting the carbon nanotubes with surfaces of the polymer, or introducing the carbon nanotubes into pores of the polymer by solution-based methods, such that by physical attractive forces such as van der Waals interactions the carbon nanotubes remain associated with the polymer material, even if no chemical bond is formed. Specific examples of porous matrix polymers include, without limitation, polyethylene (PE), polypropylene (PP), and polyurethane (PU).

The polymer material of the porous matrix polymer may be in any form that facilitates the absorption of oil and organic compounds into a porous matrix when the porous matrix polymer is exposed to or submerged in a fluid medium containing the oil or organic compounds. For example, in some embodiments, the porous matrix polymer is a foam of a polymer material such as polyethylene, polypropylene, or polyurethane. The foam may be a flexible foam or a semirigid foam, provided the foam is compressible to an extent necessary to enable expulsion of absorbed fluids by compression of the foam. Flexible polyurethane foams, for example, typically have densities from 10 kilograms per cubic meter ($kg/m^3$) to 60 $kg/m^3$, and 40% compression stress from 0.003 megapascal (MPa) to 0.004 MPa. Semi-rigid foams in the density range from 30 $kg/m^3$ to 60 $kg/m^3$ may have 40% compression stress from 0.019 megapascal (MPa) to 0.070 MPa.

The porous matrix polymer may be a block, a slab, or a membrane of the porous polymer material having any shape or size suitable for absorbing oils or organic fluids at a desired scale. In some embodiments, the porous matrix polymer may have average pore sizes from 100 nanometers (nm) to 1000 nm, or from 100 nm to 500 nm, or from 150 nm to 500 nm, or from 200 nm to 400 nm, or from 200 nm to 300 nm, or any subset of any of these ranges. In some embodiments, the porous matrix polymer may have a surface area from 5 square meters per gram ($m^2/g$) to 50 $m^2/g$, or from 5 $m^2/g$ to 30 $m^2/g$, or from 5 $m^2/g$ to 20 $m^2/g$, or from 10 $m^2/g$ to 20 $m^2/g$, or any subset of any of these ranges. In some embodiments, the porous matrix polymer may expand or increase in volume when the oils or organic fluids are absorbed.

In example embodiments, the composite material may include from 2% to 20% by weight porous matrix polymer, based on the total weight of the composite material. In further example embodiments, the composite material may include from 3% to 18%, or from 4% to 15%, or from 5% to 15%, or from 5% to 10%, or from 8% to 10% by weight porous matrix polymer, or any subset of these ranges, based on the total weight of the composite material.

In the composite materials according to embodiments, carbon nanotubes (CNTs) are grafted to surfaces of the porous matrix polymer. Surfaces of the porous matrix polymer to which the CNTs may be grafted include both external surfaces of the porous matrix polymer and internal surfaces of the porous matrix polymer such as surfaces within pores or a porous network inside the porous matrix polymer. Carbon nanotubes grafted to surfaces of the porous matrix polymer in the composite material may be single-walled or multi-walled. The carbon nanotubes may be grafted to the surfaces of the porous matrix polymer through oxygen-containing functional groups on the carbon nanotubes chemically linked to a polymer backbone of the porous matrix polymer. As carbon allotropes based on non-polar matrices of hexagonal carbon rings, carbon nanotubes on their own exhibit both oleophilic and hydrophobic properties. Therefore, in the composite materials according to embodiments, the carbon nanotubes impart or contribute to the hydrophobicity of the composite materials, even when the porous matrix polymer itself is not hydrophobic.

Carbon nanotubes in the composite materials according to embodiments may have average outer diameters from 1 nanometer (nm) to 50 nm, from 5 nm to 40 nm, from 5 nm to 30 nm, from 10 nm to 30 nm, or any subset of any of these ranges. The carbon nanotubes may have average lengths from 1 micron ($10^{-6}$ meters) to 20 micron, from 1 micron to 15 microns, from 1 micron to 10 microns, from 3 microns to 10 microns, from 5 microns to 10 microns, or any subset of any of these ranges. Thus, the carbon nanotubes may have length-to-diameter ratios from 20:1 to 10,000:1, from 150:1 to 1000:1, or any subset of any of these ranges. Carbon nanotubes in the composite materials according to embodiments may have mass densities from 1.3 grams per cubic centimeter ($g/cm^3$) to 1.8 $g/cm^3$, from 1.3 grams per cubic centimeter ($g/cm^3$) to 1.7 $g/cm^3$, from 1.3 grams per cubic centimeter ($g/cm^3$) to 1.6 $g/cm^3$, from 1.4 $g/cm^3$ to 1.7 $g/cm^3$, from 1.5 $g/cm^3$ to 1.7 $g/cm^3$, from 1.5 $g/cm^3$ to 1.65 $g/cm^3$, from 1.55 $g/cm^3$ to 1.65 $g/cm^3$, or any subset of any of these ranges. Carbon nanotubes in the composite materials according to embodiments may be open-ended, such that the nanotube resembles a rolled sheet having openings on both ends of the sheet and a hollow channel down the middle of the nanotube between the two openings. Carbon nanotubes in the composite materials also may be closed ended, such that the nanotube has a tubular body and both ends are capped with carbon structures enclosing a hollow channel through the center of the nanotube.

In example embodiments, the composite material may include from 1% to 10% by weight carbon nanotubes, based on the total weight of the composite material. In further example embodiments, the composite material may include from 2% to 10%, or from 2% to 8%, or from 2% to 6%, or from 3% to 6%, or from 4% to 5% by weight carbon nanotubes, or any subset of these ranges, based on the total weight of the composite material.

In the composite materials according to embodiments, polystyrene chains are grafted to the carbon nanotubes. The polystyrene chains may be grafted to the carbon nanotubes specifically by chemical bonding of ends of individual polystyrene chains to the carbon nanotubes through oxygen-containing functional groups such as hydroxyl groups or carboxyl groups added to the carbon nanotubes. The functional group of a functionalized carbon nanotube may provide an initial attachment point for a single molecule of styrene, such that additional molecules of styrene may polymerize onto the initial attachment point to form a polystyrene chain. Individual polystyrene chains in some examples may have from 2 to 5000, or from 2 to 2500, or from 2 to 1000, or from 2 to 100, or from 2 to 50, or from 10 to 1000, or from 10 to 500, or from 50 to 500, or from 50 to 200 styrene monomer units, or any subset of any of these ranges.

In example embodiments, the composite material may include from 70% to 97% by weight polystyrene chains, based on the total weight of the composite material. In further example embodiments, the composite material may include from 70% to 95%, or from 75% to 95%, or from 80% to 95%, or from 80% to 94%, or from 80% to 90%, or from 80% to 88% by weight polystyrene chains, or any subset of these ranges, based on the total weight of the composite material. The weight of polystyrene chains in the composite material refers to the total weight of all polystyrene chains in the composition material, without regard to the lengths or numbers of styrene monomers present on the individual polystyrene chains in the composite material.

Referring to the schematic chemical diagram of FIG. 1, the composite material 1 according to one embodiment is a composite (PS-CNT-PU) of a polyurethane (PU), carbon nanotubes (CNT), and polystyrene (PS). The composite material 1 includes a polyurethane 10 as the porous matrix polymer. The repeat unit of the polyurethane 10 has a molecular weight of 312 grams per mole (g/mol). The subscript m, referring to the number of repeat units in a single molecule of the polyurethane 10, may be from 10 to 50, or from 10 to 40, or from 15 to 35, for example. Individual carbon nanotubes 20 in the example are chemically grafted to the polymer backbone of the polyurethane 10 through amide bonds 15 connecting a nitrogen atom of the polymer backbone to a functional group on the carbon nanotubes 20 by chemical reaction of the functional group with the nitrogen atom.

Referring still to FIG. 1, polystyrene chains 30 are chemically grafted to the individual carbon nanotubes 20 through a chain-termination linkage 25 representing where a single molecule of styrene first reacted with an oxygen-containing functional group on the carbon nanotubes 20. As previously described, the subscripts n, representing a number of monomer units that compose an individual polystyrene chain, may be from 2 to 5000. The subscript n is not necessarily the same on all individual polystyrene chains 30 for the composite material 1 as a whole.

It should be readily understood that the polyurethane 10 monomer repeat unit of FIG. 1 is intended as exemplary only and that numerous other polyurethane repeat units may be substituted for the repeat unit of FIG. 1. Likewise, it should be understood that polyurethane in general represents only one kind of suitable porous matrix polymer and that other polymers such as polyethylenes or polypropylenes may be substituted for the polyurethane.

The composite materials according to embodiments may exhibit hydrophobic properties, oleophilic properties, or both, owing to the structure of the composite materials, even if the porous matrix polymer itself is not substantially hydrophobic. The hydrophobic and oleophilic properties of the composite materials may be imparted by the combined hydrophobic properties of carbon nanotubes and polystyrene chains that sterically fill and surround the pore network of the porous matrix polymer. Thus, molecules entering the pore network of the porous matrix polymer in the composite material encounter and strongly absorb onto the hydrophobic carbon nanotubes and polystyrene chains with diminished exposure to the less hydrophobic polymer backbone of the porous matrix polymer. Further, hydrophilic molecules such as water are repelled by the hydrophobic chemical structure of the composite material in general and do not readily enter the porous network of the composite material. Thus, hydrophobic oils or organic compounds tend to absorb into the composite material while hydrophilic compounds such as water tends to avoid physical proximity or chemical interaction with the composite material. In some embodiments, the composite materials exhibit water contact angles greater than 120°, greater than 130°, or greater than 140° on surfaces of the composite material, as measured according to ASTM D7334. In some embodiments, the composite materials exhibit a hexane absorption capacity of at least 30 grams hexane per gram of composite material.

Figure 2:
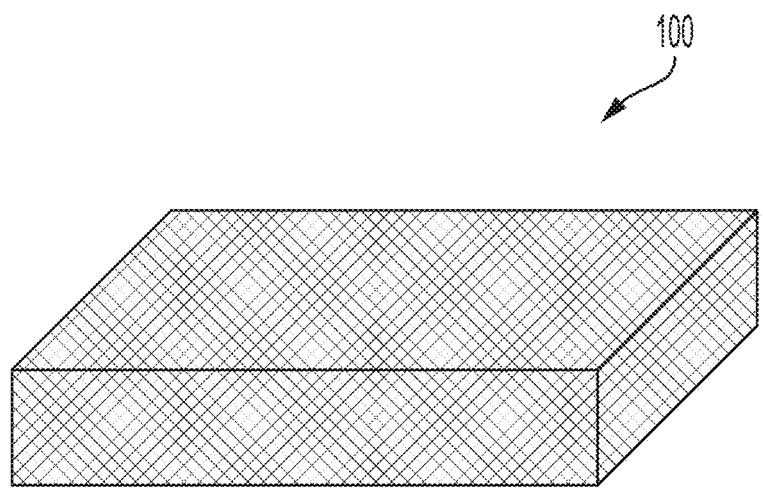
FIG. 2 is a schematic diagram of a membrane of a composite material for a fluid treatment apparatus according to embodiments of this disclosure.
Figure 3A:
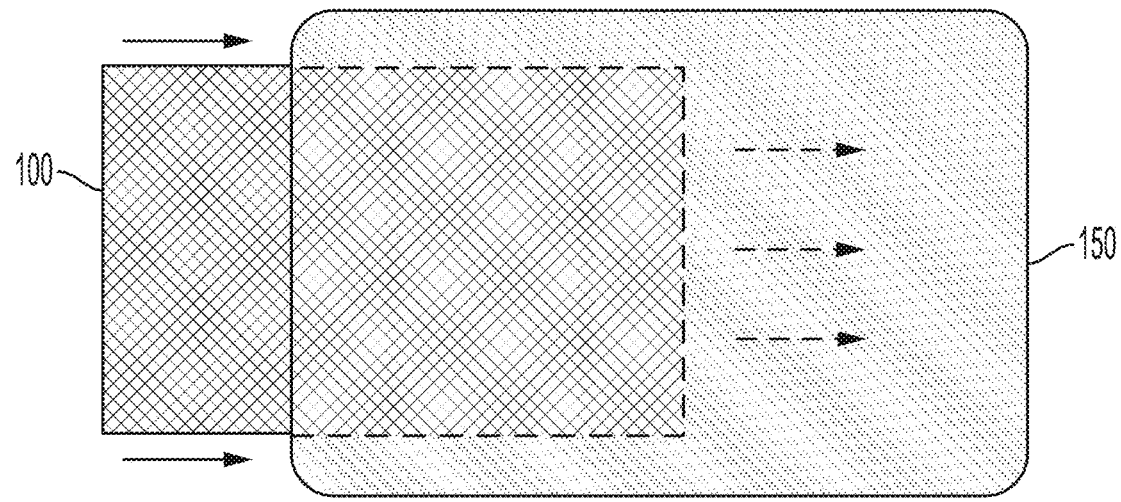
FIG. 3A is a schematic of insertion of the membrane of FIG. 2 into a fluid-permeable pouch to assemble the fluid treatment apparatus.
Figure 3B:
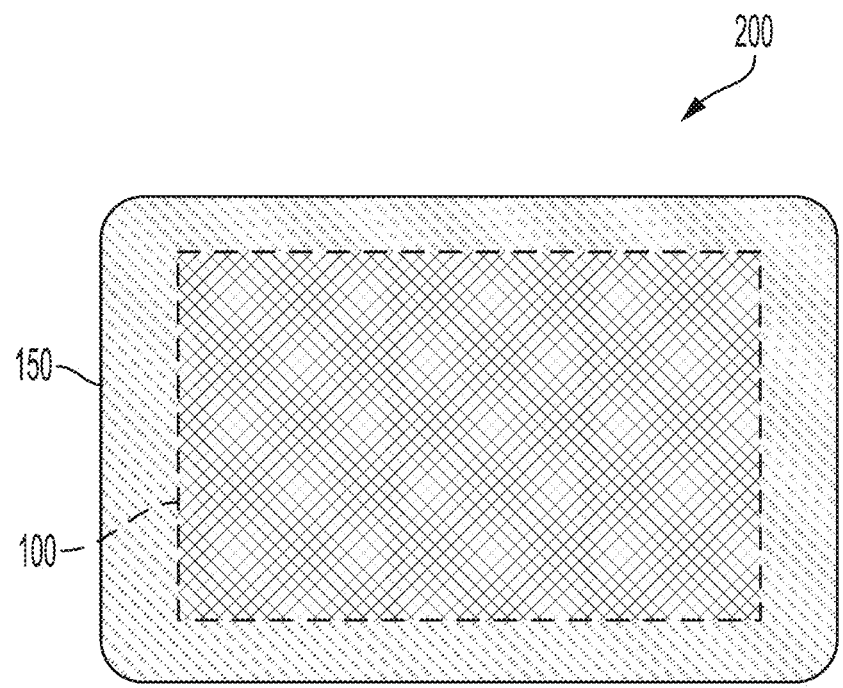
FIG. 3B is an example fluid treatment apparatus including a membrane of composite material according to embodiments.

Having described the composite materials, various embodiments of fluid treatment apparatus incorporating the composite materials will now be described. Referring to FIGS. 2, 3A, and 3B, the fluid treatment apparatus 200 may include a membrane 100 of the composite material according to any of the embodiments previously described. The membrane 100 may have any shape or size suited for the magnitude of the fluid treatment process intended to be carried out with the fluid treatment apparatus 200. It should be understood that the rectangular prismatic shape of the membrane 100 in FIG. 2 is merely an example. In some embodiments, the shape of the membrane 100 may be tailored to maximize a ratio of external surface area to volume of the membrane 100. The membrane 100 may be inserted into a fluid-permeable pouch 150 as illustrated in FIG. 3A. Thus, referring to FIG. 3B, in the fluid treatment apparatus 200, the membrane 100 of composite material may be enclosed within the fluid-permeable pouch 150.

The fluid-permeable pouch 150 of the fluid treatment apparatus 200 may be any material through which fluids are capable of passing from outside the fluid-permeable pouch 150 to the membrane 100 of composite material inside the pouch. Example materials for the fluid-permeable pouch 150 include, without limitation, porous or semiporous sheets or fabrics of polyolefins such as polyethylene or polypropylene, polyesters such as nylons, or other polymeric materials having durability sufficient for multiple reuses of the fluid treatment apparatus 200 in the particular application chosen. The fluid-permeable pouch 150 both may protect the membrane 100 from damages that may be caused by direct exposure of the membrane to a fluid mixture and also may filter or prevent premature fouling or clogging of the membrane 100 from influx of solid materials into the membrane 100 from the fluid mixture. In some embodiments, the material of the fluid-permeable pouch 150 may be selectively permeable to hydrophobic compounds.

The fluid treatment apparatus 200 may be incorporated into methods for removing hydrophobic fluids from a fluid mixture containing a combination of hydrophilic or aqueous compounds and hydrophobic compounds. As one example, the fluid mixture may be produced water from a fracking operation or other oil processing or recovery operation. As another example, the fluid mixture may be contaminated seawater, such as contaminated seawater in the vicinity of an oil spill. Both the produced water and the contaminated seawater may include water, dissolved aqueous species, oils, and non-dissolved organic species. The fluid mixture may be in the form of an emulsion of the hydrophilic components and the hydrophobic components. The fluid mixture may contain additional contaminants such as undissolved solids.

In embodiments of methods for removing hydrophobic fluids from a fluid mixture containing water and a hydrophobic component, a fluid treatment apparatus according to embodiments previously described is contacted with the fluid mixture. The fluid treatment apparatus includes a membrane of the composite material previously described contained within a fluid-permeable pouch. In example embodiments, the fluid mixture may be produced water or contaminated seawater. While the fluid treatment apparatus is in contact with the fluid mixture, the fluid mixture is allowed to absorb through the fluid-permeable pouch to contact the membrane of the composite material. As the fluid mixture contacts the membrane of the composite material, at least a portion of the hydrophobic component in the fluid mixture is allowed to adsorb onto the membrane of the composite material.

After an absorbance time, the fluid treatment apparatus is removed from the fluid mixture. The absorbance time is sufficiently long to enable at least some portion of the hydrophobic component to absorb and may be as long as practical. After a certain amount of absorbance time ranging from 5 seconds to 5 days, the membrane absorbs its maximum possible amount of hydrophobic component and must be at least partially emptied before additional hydrophobic component can be absorbed. Therefore, the methods for removing hydrophobic fluids from the fluid mixture may further include expelling the hydrophobic component adsorbed onto the membrane from the fluid treatment apparatus and, optionally, reusing the fluid treatment apparatus to absorb additional hydrophobic component from the fluid mixture. The hydrophobic component may be expelled from the membrane by applying a force to the membrane. The force may be applied by any method or means practical for removing a liquid absorbed in a membrane including, but not limited to, compressing or squeezing the membrane, or spinning the membrane in a rotating device such as a centrifuge.

The composite material according to embodiments of this disclosure may be incorporated into a filtration apparatus for fluid mixtures including a hydrophobic component. Examples of fluid mixtures include, but are not limited to, produced waters, contaminated seawater, or industrial fluid streams. In an exemplary filtration apparatus, a membrane of the composite material as previously described is placed in fluidic communication with a stream of a fluid mixture that flows by gravity or applied pressure through the membrane. As the fluid mixture flows through the membrane of the composite material, the hydrophobic component of the fluid mixture is absorbed or entrapped in the membrane, while non-hydrophobic components of the fluid mixture pass through the membrane. At regular time intervals depending on the volume of the membrane, the contents of the fluid mixture, and the volume of fluid mixture that passes through the membrane during the time interval, the membrane may be removed from the fluid stream, emptied of the collected hydrophobic component, then optionally reused in the filtration apparatus.

Having described the composite material, the fluid treatment apparatus, methods for removing hydrophobic components from fluid mixtures, and filtration apparatus, methods for preparing the composite materials will now be described. In embodiments of methods for preparing a composite material for removing hydrophobic components from a fluid, a membrane of a porous polymer material may be exposed to a dispersion of hydroxyl-functionalized carbon nanotubes in a hydrophilic solvent. Examples of suitable porous polymer materials include, without limitation, polyurethanes, polyethylenes, and polypropylenes. While the porous polymer material is exposed to the dispersion, the hydroxyl-functionalized carbon nanotubes in the dispersion are allowed to graft to the porous polymer material and form a polymer—nanotube composite membrane. The polymer—nanotube composite membrane may be dried to remove the hydrophilic solvent. The polymer—nanotube composite membrane is then contacted with styrene to form a polymerization mixture. For example, styrene may be dripped or sprayed onto the polymer—nanotube composite membrane, or the polymer—nanotube composite membrane may be soaked with or immersed in styrene. The styrene is allowed to absorb into the polymer—nanotube composite membrane. Then, the polymerization mixture may be exposed to ultraviolet radiation to initiate polymerization of the styrene and form the composite material. Upon polymerization of the styrene, the composite material includes the porous polymer material, carbon nanotubes grafted to the porous polymer material, and polystyrene chains grafted to the carbon nanotubes.

Unless otherwise defined, all technical and scientific terms used in this disclosure have the same meaning as commonly understood by one of ordinary skill in the art to which the invention belongs. The terminology used in the description is for describing particular embodiments only and is not intended to be limiting. As used in the specification and appended claims, the singular forms "a," "an," and "the" are intended to include the plural forms as well, unless the context clearly indicates otherwise.

EXAMPLES

The following examples are offered by way of illustration of the embodiments of this disclosure. One skilled in the art will recognize that the following examples are not meant to be limiting to the scope of the disclosure or its appended claims.

All chemicals and the reagents used in the following Examples were of analytical grade and were used without any further purification. Acetone was acquired from Merck. Hexane and styrene were purchased from the Sigma-Aldrich. Distilled water was used as the water source in all experiments.

A Micromeritics TriStar II Plus instrument was used for finding the BET surface area of the hydrophobic materials synthesized in the following Examples. A Thermo Scientific Nicolet iS10 instrument was used for the recording of Fourier-transform infrared spectroscopy (FTIR). A Blue M oven was used for drying of samples. A Perkin—Elmer 16F PC FTIR spectrometer was used to record IR (infrared) spectra. Surface morphology was analyzed by Field Emission Scanning Electron Microscopy (FE-SEM) using a JEOL JSM-6610LV scanning electron microscope at 20-keV (kilo electron volts) acceleration voltage. Surfaces of the multiwall carbon nanotubes were characterized by field-emission transmission electron microscopy (FE-TEM) using a (JOEL-2100F) and by Raman spectroscopy using a model LabRAM HR Evolution instrument by HORIBA Scientific. For TEM characterization of CNTs, The CNTs were dispersed in ethanol to load on the TEM grid.

Polyurethane foam samples used in the following Examples were sourced from Dalian Tenghui. The polyurethane foams had an average density of 80 kilograms per cubic meter (kg/m$^3$) (0.08 grams per cubic centimeter; g/cm$^3$), a BET surface area of 13 square meters per gram (m$^2$/g), and a BET pore size of 2600 angstroms (260 nm). The polyurethane had a weight-average molecular weight from 5 kilodalton to 10 kilodalton. Prior to further treatment, samples of polyurethane foam were washed and sonicated in ethanol, then dried.

Carbon nanotubes used in the following Examples were open-ended multiwall carbon nanotubes having an average outside diameters of 10 nm to 30 nm, average lengths of 5 microns to 10 microns, and a mass density of 1.6 g/cm$^3$. The carbon nanotubes were prepared by standard chemical vapor deposition techniques and were subsequently functionalized with oxygen-containing groups, namely hydroxyl groups and carboxylic acid groups, by treatment of the carbon nanotubes in 4-molar nitric acid for 6 hours at 100 degrees Celsius (° C.). Without intent to be bound by theory, it is believed that the oxygen-containing functional groups on the carbon nanotubes facilitate the grafting of the carbon nanotubes to both the polyurethane and the polystyrene components of the composites prepared in the following Examples. The functionalized carbon nanotubes used in the following Examples were characterized initially by Raman spectrometry, Fourier-transform infrared (FTIR) spectroscopy, and transmission electron microscopy (TEM).

Figure 4:
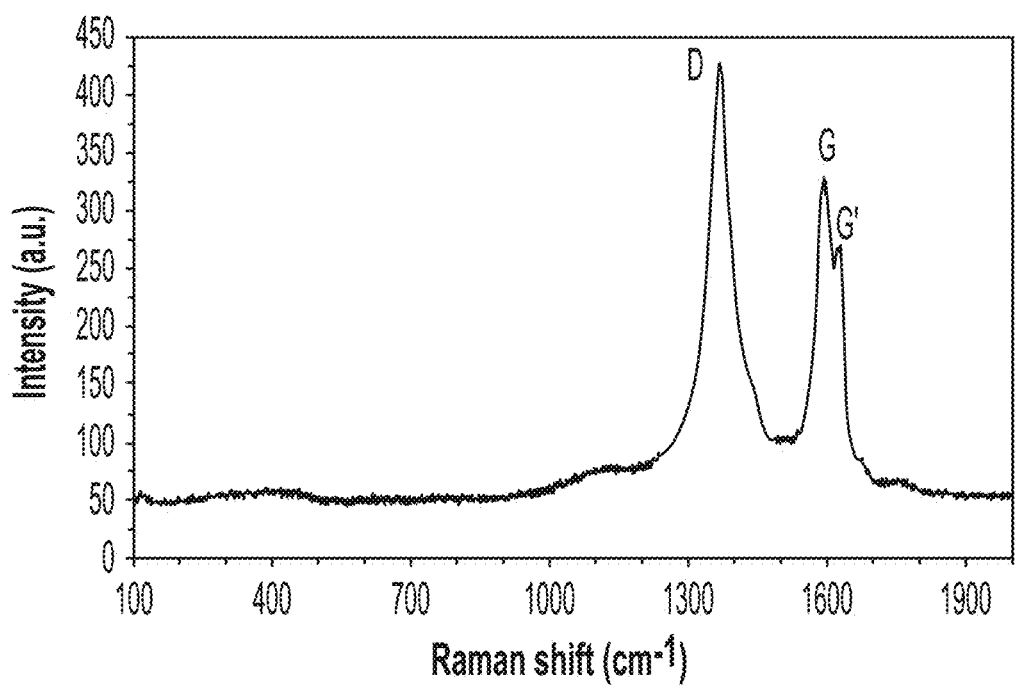
FIG. 4 is a Raman spectrum of functionalized carbon nanotubes prior to grafting onto a porous matrix polymer.

The Raman spectrum of FIG. 4 for the functionalized carbon nanotubes confirmed the graphitized structure of the nanotubes with a G-band observed at approximately 1580 wavenumbers (cm$^{-1}$). A D-band observed at 1351 cm$^{-1}$ is attributed to the distorted sp$^2$ carbon atoms of non-graphitic components of the nanotubes. A G'-band appearing as a shoulder to the G-band in the range of about 2650 cm$^{-1}$ to about 2680 cm$^{-1}$ indicates high purity ordered nanotubes having good graphitization.

Figure 5:
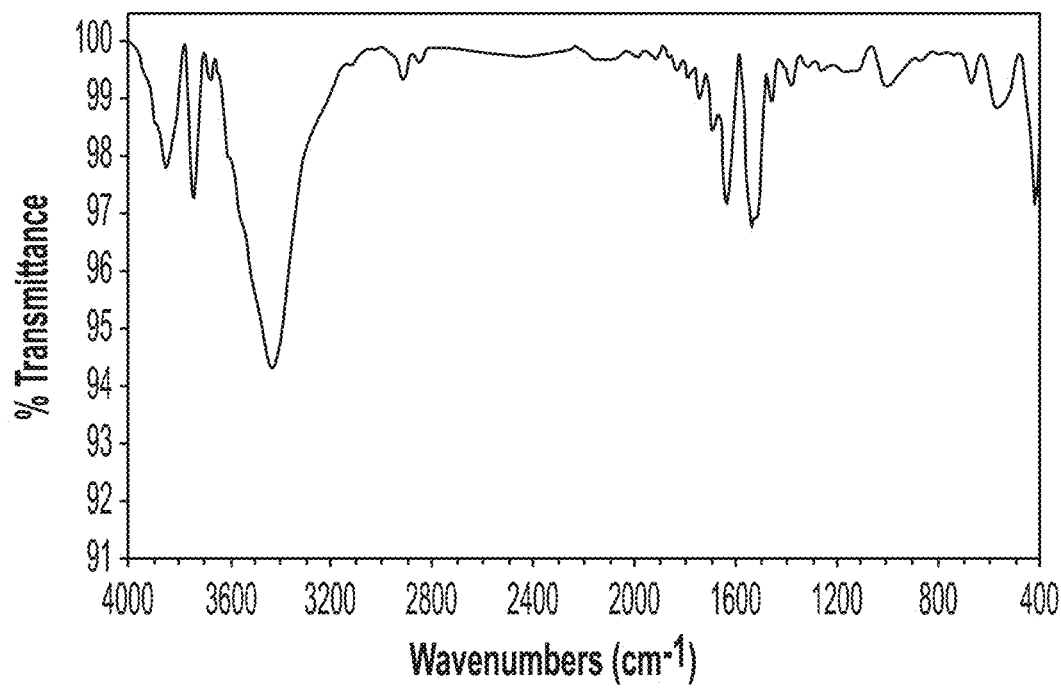
FIG. 5 is a Fourier-Transform Infrared (FTIR) spectrum of functionalized carbon nanotubes prior to grafting onto a porous matrix polymer.

The FTIR spectrum of FIG. 5 for the functionalized carbon nanotubes evidences several prominent chemical groups. A peak representing stretch of carbon-carbon double bonds that arise from unoxidized sp$^2$ carbon-carbon single bonds appears at 1661 cm$^{-1}$. A peak assigned to stretching of the group HC=C— appears at 2973 cm$^{-1}$. Further, the functionalization of the carbon nanotubes is evident from carbon-oxygen (C—O) vibration at 1251 cm$^{-1}$; hydroxyl (O—H) stretching vibrations at 3487 cm$^{-1}$; carbonyl (C=O) stretching from carboxyl groups (—COOH) at 1720 cm$^{-1}$; and oxygen-hydrogen stretching (CO—H) from the OH components of the carboxyl groups at 1381 cm$^{-1}$.

Figure 6:
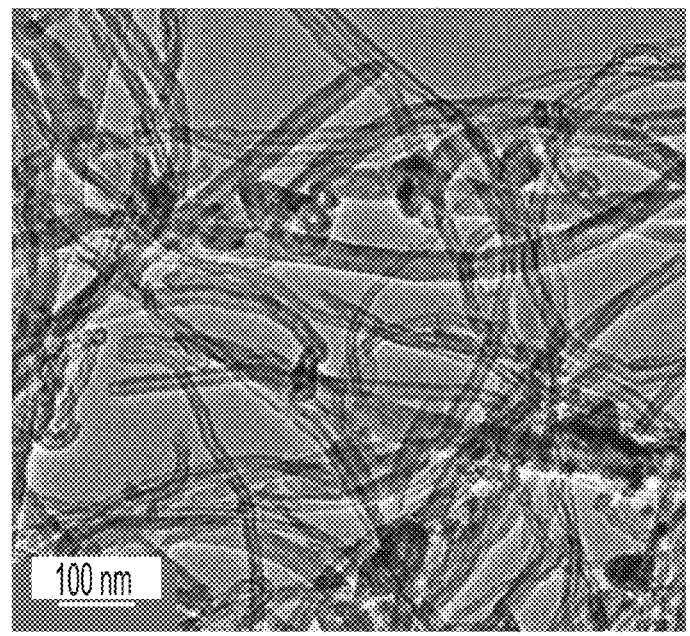
FIG. 6 is a transmission electron micrograph of carbon nanotubes prior to grafting onto a porous matrix polymer.

The TEM micrograph of FIG. 6 for the carbon nanotubes confirms that the carbon nanotubes had an open-ended, multiwall structure with inside diameters of about 30 nanometers.

Example 1

Preparation of PS-CNT-PU Composites

Various polystyrene-carbon nanotube-polyurethane (PS-CNT-PU) composite materials were prepared according to the following protocol.

A dispersion of carbon nanotubes in ethanol was prepared by adding the carbon nanotubes to the ethanol in an amount sufficient to provide a carbon nanotube concentration of 0.5 milligrams carbon nanotube per milliliter of the dispersion. The resulting mixture was made uniform by sonication for 30 minutes.

Figure 7:
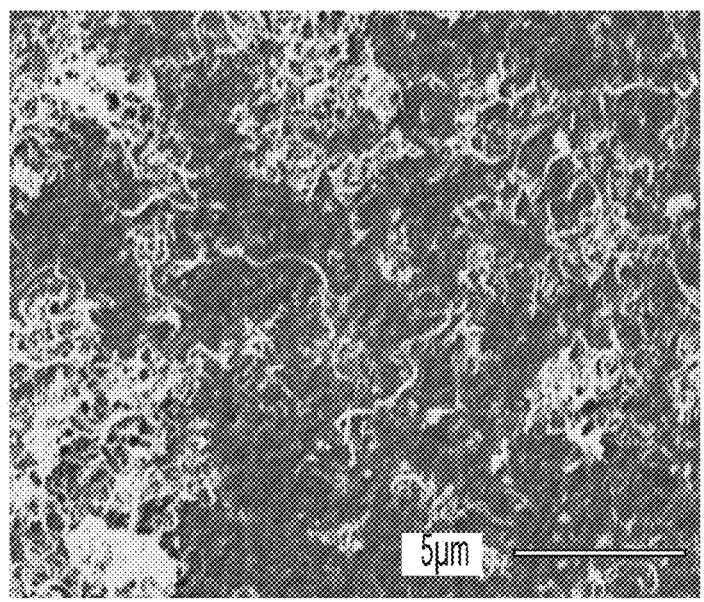
FIG. 7 is a scanning electron micrograph of a carbon nanotube-grafted polyurethane composite prior to grafting of polystyrene to form a composite material according to embodiments.

To the carbon nanotube dispersion, 0.2-gram pieces of the polyurethane foam were added while the dispersion was continuously stirred for 30 minutes. During the stirring process, the carbon nanotubes in the dispersion entered into the porous network of the polyurethane foam pieces. The impregnated foam pieces were then removed from the dispersion and were subsequently dried in an oven to cure. During the curing process, the hydroxyl functionalities on the individual carbon nanotubes associated with or chemically reacted with the polyurethane polymer backbone of the foam to graft the carbon nanotubes to the polyurethane matrix. An exemplary scanning electron micrograph (SEM) of a nanotube-grafted polyurethane composite is provided in FIG. 7.

Four individual nanotube-impregnated polyurethane foam pieces prepared as previously described were placed into four separate glass reactors each containing varied amounts of styrene, specifically 1 milliliter (mL) (Sample PS-CNT-PU-1), 2 mL (Sample PS-CNT-PU-2), 3 mL (Sample PS-CNT-PU-3), and 5 mL (Sample PS-CNT-PU-5). The glass reactors were exposed to sunlight to initiate polymerization of the styrene. After polymerization of the styrene was complete, the resulting composites were removed from the glass reactors for physical characterization and further testing. The compositions of the samples are reported in Table 1.

TABLE 1

Compositions of PS-CNT-PU Composites

| Sample | Initial Masses of Components (grams) | | | | Final Composite Composition (weight percent) | | |
|---|---|---|---|---|---|---|---|
| | PU | CNT | Styrene | Total | PU | CNT | PS |
| PS-CNT-PU-1 | 0.2 | 0.1 | 0.91 | 1.21 | 16.6% | 8.3% | 75.1% |
| PS-CNT-PU-2 | 0.2 | 0.1 | 1.81 | 2.11 | 9.5% | 4.7% | 85.8% |
| PS-CNT-PU-3 | 0.2 | 0.1 | 2.72 | 3.02 | 6.6% | 3.3% | 90.1% |
| PS-CNT-PU-5 | 0.2 | 0.1 | 4.53 | 4.83 | 4.1% | 2.1% | 93.8% |

Example 2

Physical Characterization of PS-CNT-PU Composites

The PS-CNT-PU composites prepared according to Example 1 of this disclosure were characterized by Fourier-transform infrared (FTIR) spectroscopy and scanning electron microscopy (SEM).

Figure 8:
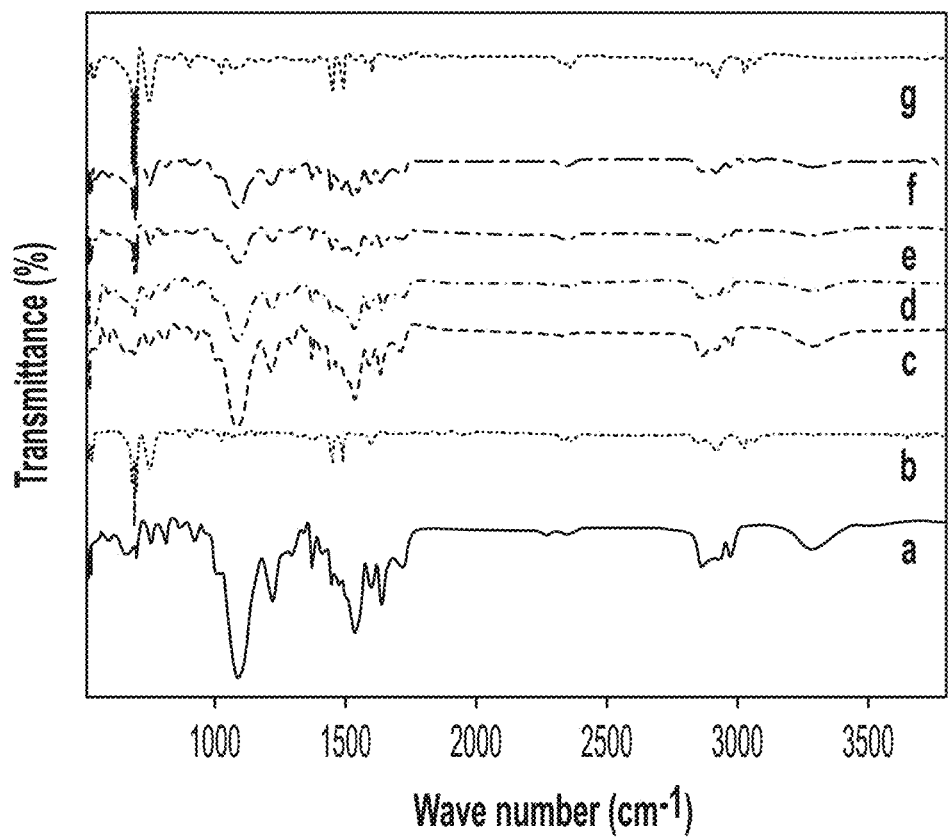
FIG. 8 is a stacked FTIR plot including individual FTIR spectra for (a) polyurethane foam; (b) polystyrene-grafted polyurethane; (c) carbon-nanotube grafted polyurethane; and (d-g) polystyrene carbon nanotube polyurethane composite materials according to embodiments having varying weight portions of polyurethane, carbon nanotube, and polystyrene.

Stacked FTIR spectra are provided in FIG. 8 for (a) polyurethane foam (PU); (b) polystyrene-grafted polyurethane (PS-PU); (c) carbon-nanotube grafted polyurethane (CNT-PU); (d) PS-CNT-PU-1 composite prepared according to Example 1 of this disclosure; (e) PS-CNT-PU-2 composite prepared according to Example 1 of this disclosure; (f) PS-CNT-PU-3 composite prepared according to Example 1 of this disclosure; and (g) PS-CNT-PU-5 composite prepared according to Example 1 of this disclosure.

In the FTIR spectra of FIG. 8 generally, the polyurethane and the polystyrene are characterized by the presence of certain functionalities and absorption bands. A strong absorption band at 695 $cm^{-1}$ is the characteristic band of the aromatic carbon-carbon out-of-plane bend. This band appeared in all synthesized composites with varying intensities. The band was slightly shifted from 695 $cm^{-1}$ to 696 $cm^{-1}$ with the introduction of carbon nanotubes (spectra (c)-(g)). The carbon-hydrogen out-of-plane bend initially observed in the functionalized carbon nanotubes at 751 $cm^{-1}$ was shifted in the composites to 753 $cm^{-1}$ in the composites. Characteristic aromatic overtone bands were present in the range of 1600 $cm^{-1}$ to 1800 $cm^{-1}$ in all of the PS-CNT-PU composites. The carbon-carbon (C—C) aromatic stretch was observed around 1490 $cm^{-1}$. Thus, the incorporation of carbon nanotubes resulted in notable changes to the IR spectra of the composites compared to the IR spectrum of the initial functionalized carbon nanotubes (FIG. 5). In particular, the bands observed in the IR spectrum of the functionalized carbon nanotubes were not present in the IR spectra of the PS-CNT-PU composites. It is believed that the absence of these bands indicate successful grafting of the carbon nanotubes with the polymers to form PS-CNT-PU composites.

Figure 9B:
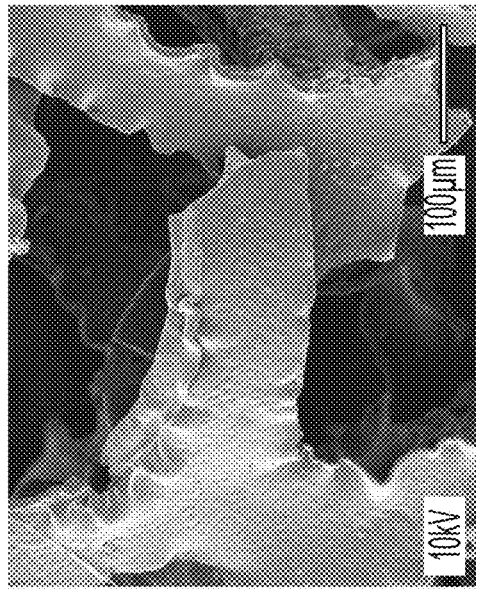
FIG. 9B is a scanning electron micrograph of a polystyrene carbon nanotube polyurethane composite material of 9.5% by weight polyurethane, 4.7% by weight carbon nanotube, and 85.8% polystyrene.
Figure 9D:
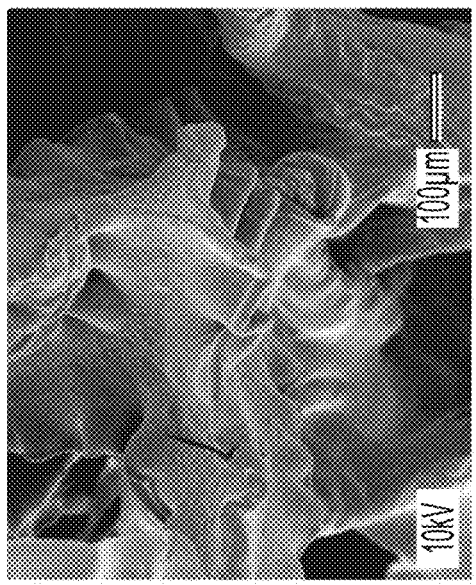
FIG. 9D is a scanning electron micrograph of a polystyrene carbon nanotube polyurethane composite material of 4.1% by weight polyurethane, 2.1% by weight carbon nanotube, and 93.8% polystyrene.
Figure 9A:
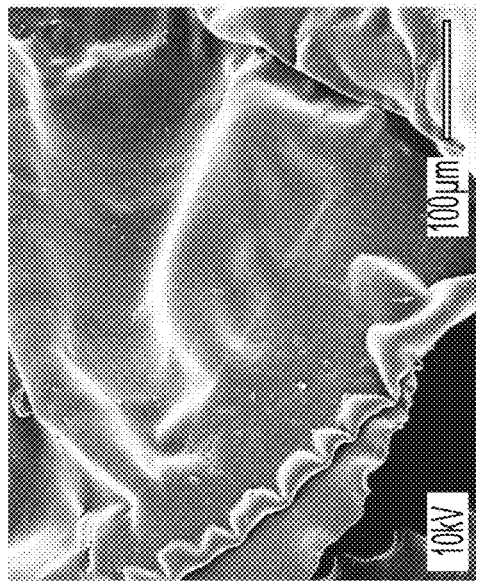
FIG. 9A is a scanning electron micrograph of a polystyrene carbon nanotube polyurethane composite material of 16.6% by weight polyurethane, 8.3% by weight carbon nanotube, and 75.1% polystyrene.
Figure 9C:
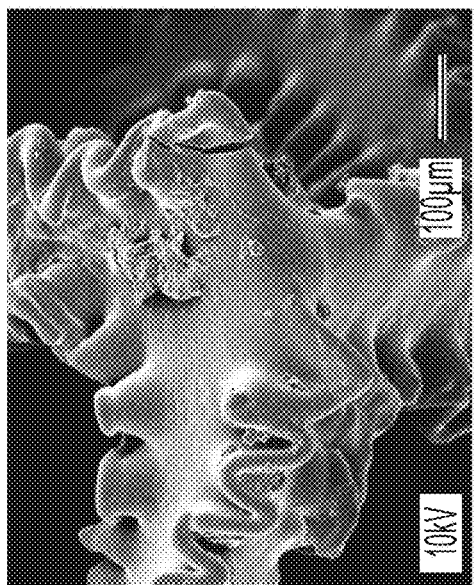
FIG. 9C is a scanning electron micrograph of a polystyrene carbon nanotube polyurethane composite material of 6.6% by weight polyurethane, 3.3% by weight carbon nanotube, and 90.1% polystyrene.

From the SEM microscopy of the various PS-CNT-PU composites, the presence of carbon nanotubes was evident both on the surface of the polyurethane and in the porous structure of the polyurethane. Without intent to be bound by theory, it is believed that the presence of the carbon nanotubes both on the surface and in the pores of the composites may increase the ability of the composites to separate hydrophobic molecules from hydrophilic molecules and may increase adsorption capacity of the composites. The SEM microscopy further revealed a porous structure including hierarchical shapes with dimensions from about one micron to several microns, in which the walls of the pore structures of the composites appeared to have a network of carbon nanotubes arranged as thin layers. The polystyrene component of the composites contributed to physical features having unusual geometries, typically in the form of wave-like structures on the edges of the composites. Exemplary SEM micrographs of PS-CNT-PU-1 (FIG. 9A), PS-CNT-PU-2 (FIG. 9B), PS-CNT-PU-3 (FIG. 9C), and PS-CNT-PU-5 (FIG. 9D) show the wave-like edges composed of polystyrene on the composites.

Example 3

Hydrophobicity Characterization of PS-CNT-PU Composites

Figure 10B:
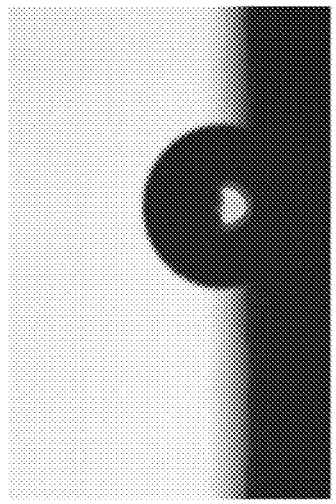
FIGS. 10A and 10B are photographs of a water droplet on a surface of a composite of carbon nanotubes and polyurethane with no grafted polystyrene.
Figure 10A:
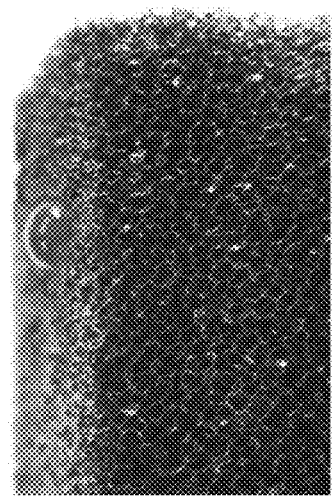
Figure 11A:
FIGS. 11A and 11B are photographs of a water droplet on a surface of the composite material of FIG. 9A.
Figure 11B:
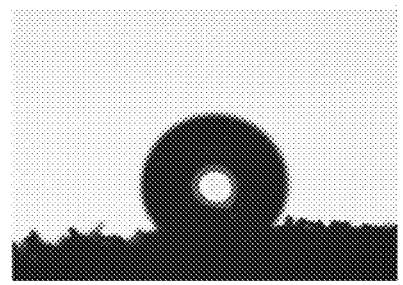
Figure 12A:
FIGS. 12A and 12B are photographs of a water droplet on a surface of the composite material of FIG. 9B.
Figure 12B:
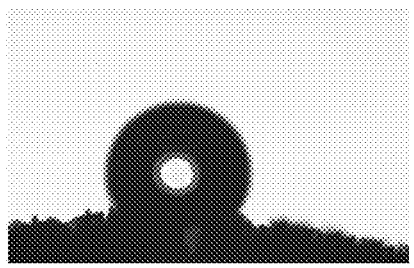
Figure 13A:
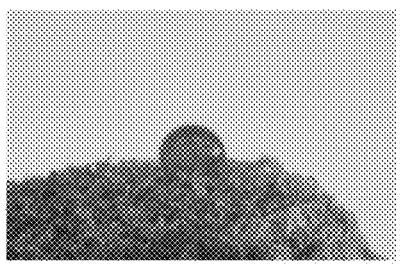
FIGS. 13A and 13B are photographs of a water droplet on a surface of the composite material of FIG. 9C.
Figure 13B:
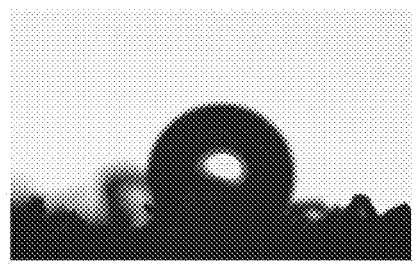
Figure 14A:
FIGS. 14A and 14B are photographs of a water droplet on a surface of the composite material of FIG. 9D.
Figure 14B:
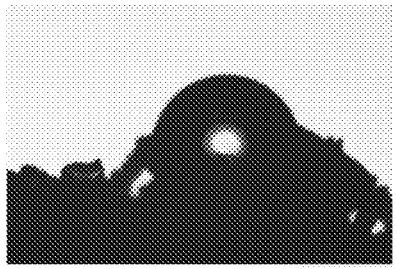

Hydrophobic characteristics of the PS-CNT-PU composites prepared according to Example 1 were evaluated by measuring water contact angle on the composite surfaces. As bases for comparison, water contact angle was measured also on the polyurethane foam (PU) without carbon nanotubes or polystyrene and on a polyurethane foam grafted with carbon nanotubes (CNT-PU) but without polystyrene. In the water contact angle measurement, a greater contact angle indicates a more hydrophobic surface. A theoretically perfectly hydrophobic surface may exhibit a water contact angle of 180°. Materials classified as "superhydrophobic" typically exhibit water contact angles greater than 150°. Photographs of water droplets on the CNT-PU surface are provided in FIGS. 10A and 10B. Photographs of water droplets on the PS-CNT-PU-1 surface are provided in FIGS. 11A and 11B. Photographs of water droplets on the PS-CNT-PU-2 surface are provided in FIGS. 12A and 12B. Photographs of water droplets on the PS-CNT-PU-3 surface are provided in FIGS. 13A and 13B. Photographs of water droplets on the PS-CNT-PU-5 surface are provided in FIGS. 14A and 14B. The water contact angle data is summarized in Table 2.

TABLE 2

Water Contact Angle Measurements

| Material | Water Contact Angle |
| --- | --- |
| Polyurethane foam (comparative) | 98° |
| CNT-PU (comparative) | 122.20° ± 3.50° |
| PS-CNT-PU-1 composite | 140.75° ± 2.21° |
| PS-CNT-PU-2 composite | 146.55° ± 4.73° |
| PS-CNT-PU-3 composite | 123.00° ± 7.37° |
| PS-CNT-PU-5 composite | 87.60° ± 2.41° |

As should be apparent from the water contact angle measurements, the grafting of carbon nanotubes to the polyurethane foam increases the surface hydrophobicity of the polyurethane foam. The further variations in the water contact angle with addition of polystyrene evidence the role of polystyrene in increasing the hydrophobicity of the composite materials. The polystyrene added in the amounts that formed composites PS-CNT-PU-1 and PS-CNT-PU-2 resulted in a composite with greater surface hydrophobicity than that of the nanotube grafted polyurethane foam without polystyrene. The polystyrene added in the amount that formed composite PS-CNT-PU-3 resulted in a composite with approximately the same surface hydrophobicity compared to the nanotube grafted polyurethane foam without polystyrene. The greatest water contact angle of 146.55°±4.73° was observed on the surface of the composite PS-CNT-PU-2.

The water contact angle measurement of composite PS-CNT-PU-5 demonstrated that the surface of the composite was less hydrophobic than that of the nanotube-grafted polyurethane foam without polystyrene and less than that of the polyurethane foam. Without intent to be bound by theory, it is believed that the less hydrophobic surface of PS-CNT-PU-5 resulted from a heavy coating of polystyrene in the composite that diminishes the contribution of the carbon nanotubes in the composite to the hydrophobicity of the composite.

Example 4

Hydrocarbon Separation by PS-CNT-PU-2 Composite

The composite PS-CNT-PU-2 was further evaluated to assess its ability to separate hydrocarbons from emulsions of hydrocarbon and water. The PS-CNT-PU-2 composite prepared according to Example 1 of this disclosure was enclosed within a semipermeable polypropylene membrane pouch, and the enclosed composite was placed into a glass container. An emulsion of heptane and water (5:1 volume to volume) was added to the glass container in an amount sufficient to submerge the pouch enclosing the composite. The pouch remained in the heptane/water emulsion for 10 minutes while the heptane was allowed to move from the emulsion, through the pouch, and into the composite. The pouch was removed from the emulsion, and a gentle squeezing force was applied to the pouch over a separate container. Upon application of the squeezing force, pure heptane was released from the pouch into the separate container. A control experiment was performed with an empty polypropylene pouch. The liquid released upon squeezing the empty pouch was biphasic, and separation had not occurred. Thus, the capability of the PS-CNT-PU-2 composite to separate a non-polar hydrocarbon from a mixture of the hydrocarbon and water was demonstrated.

Example 5

Hydrocarbon Absorption Capacity and Regeneration of PS-CNT-PU-2 Composite

Figure 15:
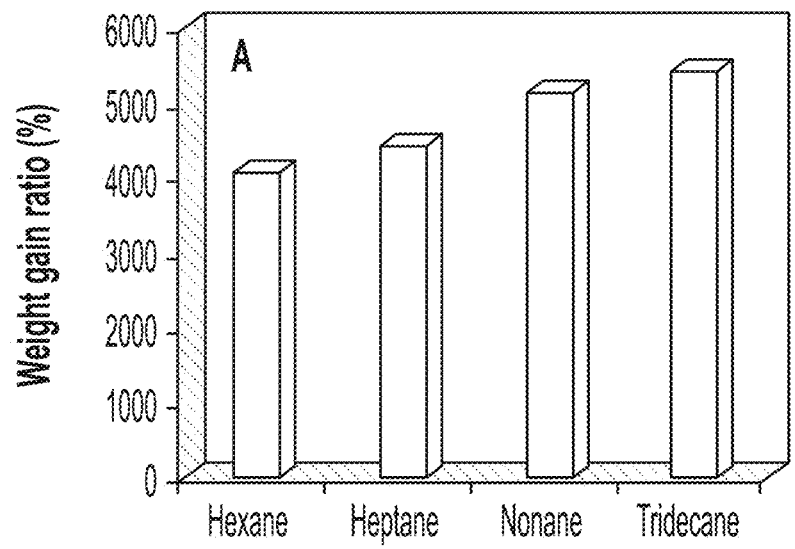
FIG. 15 is a bar graph of absorption capacity of a polystyrene carbon nanotube polyurethane composite material of 9.5% by weight polyurethane, 4.7% by weight carbon nanotube, and 85.8% polystyrene for various hydrophobic alkane compounds.

To assess the absorption capacity of a PS-CNT-PU composite toward various hydrocarbons, PS-CNT-PU-2 composites prepared according to Example 1 of this disclosure were enclosed within semipermeable polypropylene membrane pouches, and an initial weight measurement was taken. The pouches were submerged for 10 minutes in various hydrocarbons (hexane, heptane, nonane, and tridecane). The pouches were reweighed after removal from the hydrocarbon, and a weight gain ratio was computed as a percent by dividing the final weight by the initial weight. As shown in the graph of FIG. 15, the pouches containing the PS-CNT-PU-2 composite absorbed over 40 times their original weight in hexane (weight gain ratio greater than 4000%) and over 50 times their original weight in tridecane.

Figure 16:
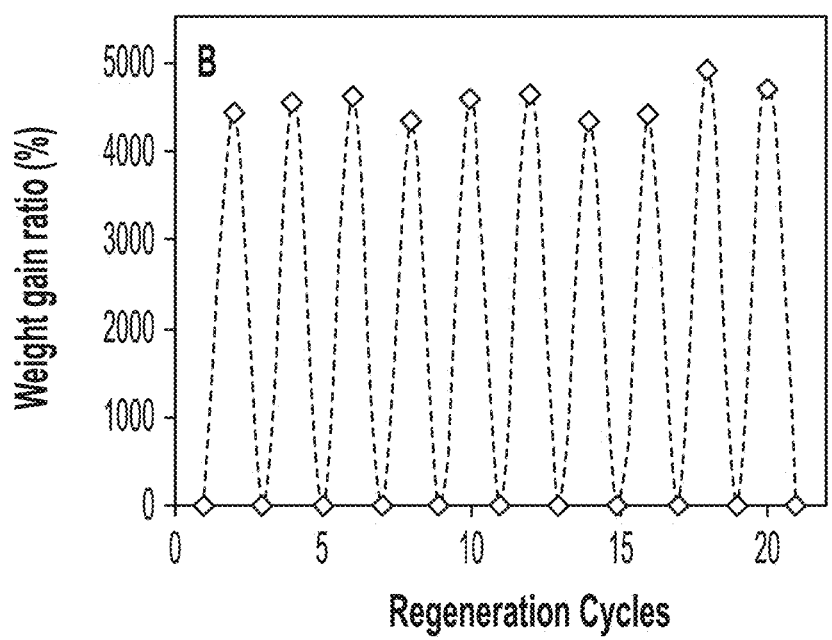
FIG. 16 is a graph of absorption capacity of a polystyrene carbon nanotube polyurethane composite material of 9.5% by weight polyurethane, 4.7% by weight carbon nanotube, and 85.8% polystyrene for hexane over ten absorption and regeneration cycles.

The ability of the PS-CNT-PU-2 composite to be reused over multiple hydrocarbon absorption cycles was assessed. For each cycle, the PS-CNT-PU-2 composite in a polypropylene pouch was dipped into heptane for 10 minutes. A weight gain ratio was calculated after each absorption cycle, as summarized in FIG. 16. The variation in weight gain ratio over twenty cycles (ten absorption plus ten regeneration cycle) had a relative standard deviation of approximately 4.11% (n=10). The recyclability of the composite, in combination with its hydrocarbon absorption capacity, demonstrate feasibility of applications of the composites in large-scale processes including, for example, industrial separation of hydrocarbons from produced water and cleaning of water from spilled oil products.

Example 6

BET Model Characteristics of PS-CNT-PU Composites

Brunauer Emmett Teller (BET) modeled physical characteristics of PS-CNT-PU composites, as compared to those of polyurethane foam, were computed from the adsorption weight gain experimental data. The BET-derived data is provided in Table 3. The value $Q_m$ is the monolayer adsorption capacity, expressed in millimoles of an adsorbed species per gram of foam or composite material.

TABLE 3

Brunauer Emmett Teller (BET) characteristics of PS-CNT-PU composites

| Composite | Surface area ($m^2$/g) | Adsorption pore size (angstrom) | Desorption pore size (angstrom) | $Q_m$ (mmole/g) |
| --- | --- | --- | --- | --- |
| Polyurethane Foam (comparative) | 13 | 2600 | 2550 | 0.1 |
| PS-CNT-PU-1 | 143 | 440 | 430 | 1.1 |
| PS-CNT-PU-2 | 240 | 110 | 98 | 2.1 |
| PS-CNT-PU-3 | 280 | 66 | 58 | 2.9 |
| PS-CNT-PU-5 | 310 | 45 | 42 | 3.1 |

The modeling data indicate that surface area and monolayer absorption capacity both increase with greater amounts of polystyrene in the PS-CNT-PU composite material. Yet, as previously described in Example 3, the most hydrophobic composite as measured by water contact angle was PS-CNT-PU-2. Without intent to be bound by theory, it is believed that the hydrophobicity of the PS-CNT-PU composite materials may generally increase up to an optimal value correlated with a particular surface area and monolayer absorption capacity, then generally decrease with further increases of surface area and monolayer absorption capacity. Even so, the prepared PS-CNT-PU composite materials have been demonstrated to be sufficiently hydrophobic materials for providing efficient and eco-friendly removal of oil and hydrocarbon components from water. Moreover, similar trends and observations are expected for alternate composite materials such as PS-CNT-PE composite materials and PS-CNT-PP composite materials (where PE is polyethylene, and PP is polypropylene).

Items Listing

Item 1: A composite material for removing hydrophobic components from a fluid, the composite material comprising: a porous matrix polymer comprising a polyurethane, a polyethylene, or a polypropylene; carbon nanotubes grafted to surfaces of the porous matrix polymer; and polystyrene chains grafted to the carbon nanotubes.

Item 2. The composite material of item 1, in which the porous matrix polymer is a polyurethane.

Item 3. The composite material of item 1, in which the porous matrix polymer is a polyurethane foam.

Item 4. The composite material of any of the preceding items, wherein the surfaces of the porous matrix polymer comprise outer surfaces of the porous matrix polymer and internal pore surfaces of the porous matrix polymer.

Item 5. The composite material of any of items 1 to 4, comprising: from 2% to 20% by weight porous matrix polymer, based on the total weight of the composite material; from 1% to 10% by weight carbon nanotubes, based on the total weight of the composite material; and from 70% to 97% by weight polystyrene chains, based on the total weight of the composite material.

Item 6. The composite material of any of items 1 to 4, comprising: from 4% to 15% by weight porous matrix polymer, based on the total weight of the composite material; from 2% to 6% by weight carbon nanotubes, based on the total weight of the composite material; and from 80% to 94% by weight polystyrene chains, based on the total weight of the composite material.

Item 7. The composite material of any of items 1 to 4, comprising: from 8% to 10% by weight porous matrix polymer, based on the total weight of the composite material; from 4% to 5% by weight carbon nanotubes, based on the total weight of the composite material; and from 80% to 88% by weight polystyrene chains, based on the total weight of the composite material.

Item 8. The composite material of any of the preceding items, in which the composite material has an average pore size from 100 nm to 1000 nm.

Item 9. The composite material of any of the preceding items, in which the composite material exhibits a water contact angle greater than 120°, as measured by ASTM D7334.

Item 10. The composite material of any of the preceding items, in which the composite material exhibits a hexane absorption capacity of at least 30 grams hexane per gram of composite material.

Item 11. The composite material of any of the preceding items, in which the carbon nanotubes are grafted to the surfaces of the porous matrix polymer through oxygen-containing functional groups on the carbon nanotubes chemically linked to a polymer backbone of the porous matrix polymer.

Item 12. A fluid treatment apparatus comprising a membrane of the composite material according to any of the preceding items, the membrane being enclosed within a fluid-permeable pouch.

Item 13. A method for removing hydrophobic fluids from a fluid mixture containing water and a hydrophobic component, the method comprising: contacting a fluid treatment apparatus according to item 12 with the fluid mixture; allowing the fluid mixture to absorb through the fluid-permeable pouch to contact the membrane of the composite material; allowing at least a portion of the hydrophobic component to adsorb onto the membrane of the composite material; and removing the fluid treatment apparatus from the fluid mixture.

Item 14. The method of item 13, further comprising expelling the hydrophobic component adsorbed onto the membrane from the fluid treatment apparatus.

Item 15. The method of item 13 or 14, further comprising reusing the fluid treatment apparatus to absorb additional hydrophobic component from the fluid mixture.

Item 16. The method of any of items 13 to 15, in which the fluid mixture is produced water.

Item 17. The method of any of items 13 to 15, in which the fluid mixture is contaminated seawater.

Item 18. A filtration apparatus comprising a membrane of the composite material according to any of items 1 to 11 in fluidic communication with a produced water source.

Item 19. A method for preparing a composite material for removing hydrophobic components from a fluid, the method comprising: exposing a membrane of a porous polymer material to a dispersion of hydroxyl-functionalized carbon nanotubes in a hydrophilic solvent, the porous matrix polymer comprising a polyurethane, a polyethylene, or a polypropylene; allowing the hydroxyl-functionalized carbon nanotubes in the dispersion to graft to the porous matrix polymer and form a polymer-nanotube composite membrane; drying the polymer-nanotube composite membrane to remove the hydrophilic solvent; contacting the polymer-nanotube composite membrane with styrene to form a polymerization mixture; exposing the polymerization mixture to ultraviolet radiation to polymerize the styrene and form the composite material, the composite material comprising the porous matrix polymer, carbon nanotubes grafted to the porous matrix polymer, and polystyrene chains grafted to the carbon nanotubes.

Item 20. The method of item 19, in which the porous matrix polymer is a polyurethane foam.

Having described the subject matter of the present disclosure in detail and by reference to specific embodiments, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some features in embodiments or aspects of the present disclosure are identified as particularly advantageous, it is contemplated that the present disclosure is not necessarily limited to such features.

What is claimed is:

1. A composite material for removing hydrophobic components from a fluid, the composite material comprising:
a porous matrix polymer comprising a polyurethane, a polyethylene, or a polypropylene;

carbon nanotubes grafted to surfaces of the porous matrix polymer; and polystyrene chains grafted to the carbon nanotubes, and in which the composite material has an average pore size from 100 nm to 1000 nm.

2. The composite material of claim 1, in which the porous matrix polymer is a polyurethane.

3. The composite material of claim 1, in which the porous matrix polymer is a polyurethane foam.

4. The composite material of claim 1, wherein the surfaces of the porous matrix polymer comprise outer surfaces of the porous matrix polymer and internal pore surfaces of the porous matrix polymer.

5. The composite material of claim 1, comprising:
from 2% to 20% by weight porous matrix polymer, based on the total weight of the composite material;
from 1% to 10% by weight carbon nanotubes, based on the total weight of the composite material; and
from 70% to 97% by weight polystyrene chains, based on the total weight of the composite material.

6. The composite material of claim 1, comprising:
from 4% to 15% by weight porous matrix polymer, based on the total weight of the composite material;
from 2% to 6% by weight carbon nanotubes, based on the total weight of the composite material; and
from 80% to 94% by weight polystyrene chains, based on the total weight of the composite material.

7. The composite material of claim 1, comprising:
from 8% to 10% by weight porous matrix polymer, based on the total weight of the composite material;
from 4% to 5% by weight carbon nanotubes, based on the total weight of the composite material; and
from 80% to 88% by weight polystyrene chains, based on the total weight of the composite material.

8. The composite material of claim 1, in which the composite material exhibits a water contact angle greater than 120°, as measured by ASTM D7334.

9. The composite material of claim 1, in which the composite material exhibits a hexane absorption capacity of at least 30 grams hexane per gram of composite material.

10. The composite material of claim 1, in which the carbon nanotubes are grafted to the surfaces of the porous matrix polymer through oxygen-containing functional groups on the carbon nanotubes chemically linked to a polymer backbone of the porous matrix polymer.

11. A fluid treatment apparatus for removing hydrophobic components from a fluid comprising:
a membrane comprising a composite material, the composite material comprising:
a porous matrix polymer comprising a polyurethane, a polyethylene, or a polypropylene,
carbon nanotubes grafted to surfaces of the porous matrix polymer, and
polystyrene chains grafted to the carbon nanotubes; and
a fluid-permeable pouch, the membrane being enclosed within the fluid-permeable pouch.

12. A method for removing hydrophobic fluids from a fluid mixture containing water and a hydrophobic component, the method comprising:
contacting a fluid treatment apparatus according to claim 11 with the fluid mixture;
allowing the fluid mixture to absorb through the fluid-permeable pouch to contact the membrane of the composite material;
allowing at least a portion of the hydrophobic component to adsorb onto the membrane of the composite material; and
removing the fluid treatment apparatus from the fluid mixture.

13. The method of claim 12, further comprising expelling the hydrophobic component adsorbed onto the membrane from the fluid treatment apparatus.

14. The method of claim 13, further comprising reusing the fluid treatment apparatus to absorb additional hydrophobic component from the fluid mixture.

15. The method of claim 12, in which the fluid mixture is produced water.

16. The method of claim 12, in which the fluid mixture is contaminated seawater.

17. A filtration apparatus comprising a membrane of the composite material according to claim 1 in fluidic communication with a produced water source.

18. A method for preparing a composite material for removing hydrophobic components from a fluid, the method comprising:
exposing a membrane of a porous polymer material to a dispersion of hydroxyl-functionalized carbon nanotubes in a hydrophilic solvent, the porous matrix polymer comprising a polyurethane, a polyethylene, or a polypropylene;
allowing the hydroxyl-functionalized carbon nanotubes in the dispersion to graft to the porous matrix polymer and form a polymer—nanotube composite membrane;
drying the polymer—nanotube composite membrane to remove the hydrophilic solvent;
contacting the polymer—nanotube composite membrane with styrene to form a polymerization mixture;
exposing the polymerization mixture to ultraviolet radiation to polymerize the styrene and form the composite material, the composite material comprising the porous matrix polymer, carbon nanotubes grafted to the porous matrix polymer, and polystyrene chains grafted to the carbon nanotubes, and in which the composite material has an average pore size from 100 nm to 1000 nm.

19. The method of claim 18, in which the porous matrix polymer is a polyurethane foam.

* * * * *